United States Patent [19]

Schmidt

[11] Patent Number: 4,469,836

[45] Date of Patent: Sep. 4, 1984

[54] PERFLUOROCARBON BASED POLYMERIC COATINGS HAVING LOW CRITICAL SURFACE TENSIONS

[75] Inventor: Donald L. Schmidt, Midland, Mich.

[73] Assignee: The Dow Chemical Company, Midland, Mich.

[21] Appl. No.: 538,888

[22] Filed: Oct. 4, 1983

[51] Int. Cl.$^3$ .......................... C08F 8/18; C08F 8/34; C08F 214/14; C08F 114/14

[52] U.S. Cl. .................. 524/376; 525/331.4; 525/359.4; 524/551

[58] Field of Search .............................. 524/376, 551; 525/331.4, 359.4

[56] References Cited

U.S. PATENT DOCUMENTS

| | | | |
|---|---|---|---|
| 3,172,910 | 3/1965 | Bruce | 260/539 |
| 3,216,979 | 11/1965 | Sexsmith | 525/331.4 |
| 3,236,820 | 2/1966 | Lloyd | 525/331.4 |
| 3,630,951 | 12/1971 | Netherly | 252/307 |
| 4,337,185 | 6/1982 | Wessling | 525/291 |
| 4,344,993 | 8/1982 | Schmidt | 525/150 |

FOREIGN PATENT DOCUMENTS 895918  5/1962  United Kingdom ............ 525/331.4

*Primary Examiner*—C. Warren Ivy

[57] ABSTRACT

Highly adherent release compositions having very low surface tensions comprise a polymer containing a pendant benzyl portion linked through a benzyl ester linkage to a perfluorocarbon moiety. Such compositions will not wet with any common solvents. Such compositions are most advantageously employed as release coatings on internal surfaces of molding apparatus.

12 Claims, No Drawings

PERFLUOROCARBON BASED POLYMERIC COATINGS HAVING LOW CRITICAL SURFACE TENSIONS

BACKGROUND OF THE INVENTION

This invention relates to perfluorocarbon based polymeric release coatings and to processes for using such coatings as mold release agents.

A wide variety of molding applications require molding apparatus with surfaces which will easily release molded articles and moding materials. Polymer deposits on molding apparatus surfaces resulting from the "sticking" occurring during molding processes not only make it more difficult and time consuming to remove molded parts from said molds, but such deposits have a tendency to deteriorate and fragment, thus decreasing the quality of the surfaces of products molded therefrom.

One approach directed towards obtaining surfaces which readily release adhesives has involved the application of various hydrocarbon and silicone oils, and waxes to the surfaces of molds which are exposed to said polymer compositions. Commonly hydrocarbon and silicone oils and waxes are sprayed or wiped onto injection molding apparatus, which is then used for the molding of polymers and prepolymers. Unfortunately, it is generally the case that only one to about three injection cycles may be performed before it is necessary to retreat the mold with said nonstick agents.

Another approach for providing molding apparatus surfaces which have good release characteristics is the application of fluorinated polymers, such as tetrafluoroethylene. These types of polymers are typically applied to a surface as small solid particles or as a coating. Unfortunately, these types of polymers are typically bound to surfaces with nonfluorinated binders or by a difficult process involving sintering of the polymer particles at high temperatures.

Perfluorinated polymers are believed to release because they produce a very low critical surface tension of wetting ($\gamma_c$). More recently, as disclosed in U.S. Pat. No. 4,344,993, a combination of a hydrophilic polymer with up to about 0.5 weight percent perfluorocarbon and crosslinked with a cyclic sulfonium zwitterion yields a surface coating having a surface tension of wetting of less than that of coatings consisting of 100 percent perfluorocarbon. Although this type of coating is useful for preventing deposits of non-aqueous polymerization reactants and products from adhering to reactor surfaces in the production of olefinic polymers, such a coating does not adhere adequately to surfaces of conventional molding apparatus when amounts of perfluorocarbon greater than 0.5 weight percent are employed.

Therefore, it is highly desirable to provide an improved coating which adheres well to a molding apparatus surface, and a process for using same which will significantly reduce the undesirable deposition of material and sticking on internal surfaces of molding apparatus by providing a low $\gamma_c$.

SUMMARY OF THE INVENTION

The present invention is an adherent coating composition comprising a polymer containing a pendant benzyl portion linked through a benzyl ester linkage containing a hydrocarbon moiety containing at least two carbon atoms to a perfluorocarbon moiety having a perfluoroalkyl group.

The amount of perfluorocarbon moiety is such that the resulting coating exhibits a critical surface tension of wetting of less than about 15 dynes per centimeter (dynes/cm). Surprisingly, the perfluorocarbon-containing polymer coating composition of the present invention provides a surface having a critical surface tension less than that of a coating consisting entirely of a linear perfluorocarbon, such as a homopolymer of tetrafluoroethylene. The composition of this invention provides a permanently bound coating which can be easily applied, and which is not removed or wet by most solvents.

In another aspect, the present invention is a composition comprising a polyvinylbenzyl sulfonium containing poylmer, a nucleophilic fluroalkyl-containing carboxylic acid, and a suitable solvent, such that when cured, said composition yields the aforementioned adherent coating composition.

In yet another aspect, this invention is a coated substrate wherein said coating composition is contacted with the substrate and cured. The coating compositions are particularly useful in reducing the amount of sticking of material on the internal surfaces of the molding apparatus. Accordingly, in another aspect, this invention is such a process for reducing the sticking of material to internal surfaces of molding apparatus which comprises applying a solution of the aforementioned composition to the internal surfaces of molding apparatus and curing. Such a process is advantageously employed in the molding of polymers such as polyethylenes, polypropylenes, polycarbonates, polyurethanes, and the like.

DETAILED DESCRIPTION OF THE INVENTION

Polymers of this invention are generally represented by the formula:

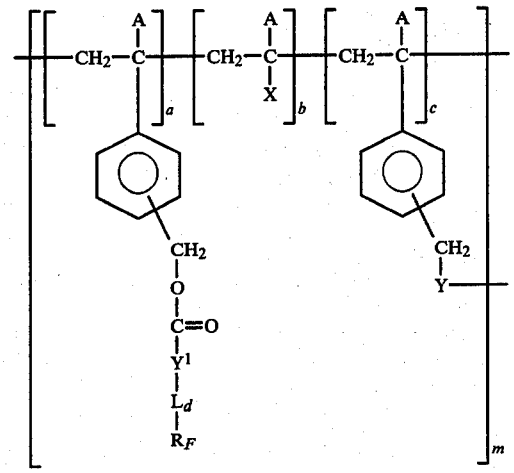

wherein $a+b+c=1$, a is greater than 0, b is from about 0 to about 0.9, c is from 0 to about 0.8, and m is about 100 to about 10,000. A is H or methyl. $Y^1$ is as defined hereinafter. L is a non-interfering radical (i.e., a group which does not interfere with the nucleophilicity of the carboxy group) and d is 0 or 1. $R_F$ is saturated perfluoroaliphatic containing moiety as described hereinafter. X can vary and is preferably an essentially nonionic moiety. X can include, for example, a species derived from butadiene, isoprene, or

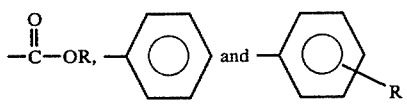

wherein R is alkyl comprising from 1 to about 12 carbon atoms. Y is the remaining portion of a polycarboxylic acid and is present in such a way that crosslinking is introduced to the polymer system.

Polymers of this invention are most preferably prepared by first preparing a sulfonium-containing polymer which can be represented by the general formula:

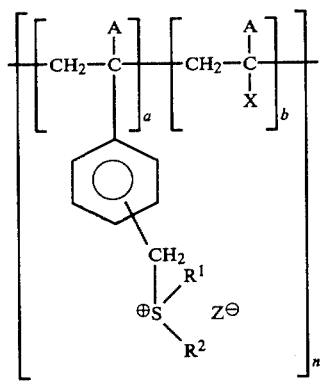

wherein a+b equals 1, b is from about 0 to about 0.9, n is about 100 to about 10,000, and A and X are as defined hereinbefore. $R^1$ and $R^2$ are individually lower alkyl, with methyl being preferred. Alternatively, $R^1$ and $R^2$ can form a cyclic species such as

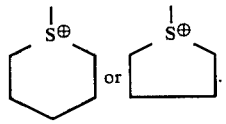

Z is a preferably anion such as carbonate, bicarbonate or hydroxide. Z can also be sulfate, sulfonate or trifluoroacetate. Sulfonium-containing polymers are most advantageously prepared using techniques known in the art as, for example, those taught in U.S. Pat. No. 4,337,185.

Crosslinking can be introduced to the sulfonium-containing polymer with a polyfunctional carboxylic acid Low equivalent weight polyfunctional carboxylic acids are preferred. Preferred polyfunctional carboxylic acids are the di- and tri-carboxylic acids. Examples of di-carboxylic acids include those represented by the formula:

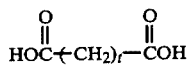

wherein t can range from 1 to about 20. The amount of crosslinking can vary and is employed in order to form a harder, more rigid product.

The sulfonium-containing polymer salt is then contacted with a nucleophilic fluoroalkyl-containing carboxylic acid in the presence of a liquid that is a solvent for each of the species (i.e., a suitable solvent). Typically, such solvents include the alkanols such as ethanol, propanol, butanol, glycols, mixtures of alkanols and mixtures of the alkanols with water.

Perfluoroalkyl-containing acids suitably employed in the practice of this invention include organic compounds represented by the formula:

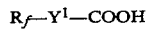

wherein $R_F$ is a perfluorocarbon or a saturated perfluoroaliphatic moiety containing a $F_3C-$ moiety and is linked to the carboxylic acid moiety through a hydrocarbon moiety (i.e., $Y^1$) containing at least 2 carbon atoms. The perfluoroaliphatic or perfluorocarbon moiety advantageously contains from about 3 to about 18 carbons wherein substantially all are fully fluorinated, preferably from about 3 to about 10 of such carbons subject to the limitation that the fluoroaliphatic moiety is linked to the carboxylic acid moiety through an aliphatic hydrocarbon moiety (i.e., $Y^1$) containing at least 2 carbon atoms. $R_F-Y^1$ can be linear, branched or cyclic, preferably linear. $Y^1$ contains a carbon-bonded hydrogen and can contain an oxygen atom, sulfur atom and/or a nitrogen atom bonded only to carbon atoms in the skeletal chain. More preferable are those linear perfluoroaliphatic moieties (i.e., $R_F$) represented by the formula: $C_nF_{2n+1}$ wherein n is in the range of about 5 to about 10. Most preferred are those linear perfluoroaliphatic or perfluorocarbon moieties represented in the paragraph below.

Perfluorocarbon containing carboxylic acids of the formula $CF_3(CF_2)_pSO_2NH(CH_2)_qCOOH$; wherein p is from about 2 to about 15, preferably about 2 to about 9, and q is from about 2 to about 4 are preferred. An especially preferred perfluorocarbon containing carboxylic acid is the carboxylic acid form of the perfluorocarbon sold by DuPont to under the trade name Zonyl ® FSA; or the carboxylic acid form of the perfluorocarbon sold under the trade name Fluorad ® FC 129 by the 3M Corporation. Examples of other preferred anionic perfluorocarbon starting materials, as well as methods of preparation, are illustrated in U.S. Pat. Nos. 3,172,910 and 3,630,951.

Accordingly, the coating composition can be applied directly (i.e., without the prior application of a primer coating) to the interior surfaces of the molding apparatus in a convenient manner, such as wiping, spraying, brushing on, and the like. Brushing has been found to be satisfactory since it ensures complete coverage of all surfaces. Any uncovered areas, such as pinholes, etc., should be avoided since such exposed areas provide sticking sites for polymer build-up. It is most desirable that one layer of coating be applied. The amount of coating applied for the thickness thereof is not particularly critical so long as a continuous film over all interior surfaces of the molding apparatus is provided. In some instances, it is preferable to pretreat the internal surfaces of the reaction vessel with conventional chemical coupling agents. For example, prehydrolyzed silane coupling agents such as

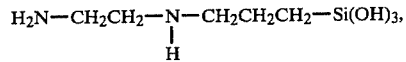

-continued

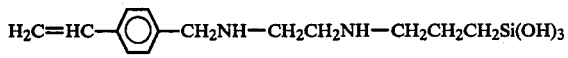

and the like are particularly useful for this purpose.

When said coating compositions are applied to the surface of a molding apparatus and cured, the resulting coatings are (1) inert to any polymeric reagents which will contact the coating in subsequent use, (2) have a $\gamma_c$ of less than about 15 dynes/cm, and (3) will not wet with any common solvents.

Following the application of the coating composition of the interior surfaces of the mold, including product transfer conduits, etc., the coating can be heated in order to dry and cure the same. Any suitable heating method can be employed, such as radiant heating, heated air, and the like. Usually, temperatures within the range of 90° to about 160° C. are sufficient; with temperatures in the range of 110° to 160° C. being preferred. The temperature chosen will depend upon the time of drying. Thereafter, the molding to be carried out in the equipment can be commenced immediately. No particular modifications of processing techniques are required due to the presence of the coating. Further, utilization of the internally coated mold of the present invention does not adversely affect the heat stability or other physical and chemical properties of the polymers or other molded products produced therein. Ordinary care should, of course, be excercised to avoid abrading or rupturing the coating.

The following examples are illustrative embodiments of this invention and should not be construed as limiting its scope. Unless otherwise indicated, all parts and percentages are by weight.

EXAMPLE 1

Polyvinylbenzyl chloride is prepared by charging into a 2-liter reaction flask equipped with a stirrer 200 g of vinyl benzyl chloride, 2 g of cumene hydroperoxide, 33 g of a 30 percent solution of sodium lauryl sulfate, 2.2 g Formapon ®, which is a sodium formaldehyde hydrosulfide catalyst sold commercially by Rohm and Haas Company, and 400 g of water. Acetic acid is added in an amount to obtain a pH of 7.2. The flask is purged with nitrogen as the mixture is reacted at 25° C. for 4 hours. The resulting latex is dialyzed to remove the surfactant.

Polyvinylbenzyl dimethyl sulfonium bicarbonate is prepared by adding 18 g of dimethyl sulfide with 200 g of a polyvinyl benzyl chloride latex (which contains 39 g of polymer). The mixture is heated under pressure at 50° C. with mixing for 3 hours to yield the sulfonium chloride containing polymer. The polymer is diluted with water and the chloride anion is exchanged to the bicarbonate form using an ion exchange resin.

A polymer of this invention is prepared by contacting with agitation 2 g of an aqueous solution of polyvinylbenzyl dimethyl sulfonium bicarbonate which contains 0.46 meq/g sulfonium with 0.6 g of Zonyl ® FSA (acid form) in a diethylene glycol methyl ether solvent having 0.62 meq/g free acid having the formula $CF_3(CF_2)_xCH_2CH_2SCH_2CH_2COOH$ (x=3 to 18), and 0.1 g of an aqueous solution of malonic acid containing 2.0 meq/g free acid. A mixture of 1 g of diethylene glycol methyl ether and 0.5 g water is added. The mixture is observed to foam and a clear solution results.

The solution so prepared is applied to a 316 stainless steel surface and cured at 150° C. for 30 minutes. The coating has a critical surface tension of wetting of 12 dynes/cm. The coating is unaffected by soaking solvents such as methyl ethyl ketone, dimethyl sulfoxide, p-xylene and tetrahydrofuran.

EXAMPLE 2

A stainless steel surface is primed with a solution of 2.0 g of a 0.46N aqueous solution of the polyvinyldimethyl sulfonium bicarbonate, 0.1 g of a 0.1M phosphoric acid solution, 1.5 g of water and 0.5 g isopropanol. The sample is cured at 130° C. for 5 minutes. The release coating of Example 1 is then applied to the primed surface and cured at 150° C. for 30 minutes. The resulting coating is unaffected by boiling water in a pressure cooker for 1 hour.

EXAMPLE 3

A polymer of this invention is prepared by contacting the following: 2 g of an aqueous solution of polyvinylbenzyl dimethyl sulfonium bicarbonate (0.46 meq/g sulfonium) is mixed with 1 g of water. To this is added with agitation, 1.70 g of Fluorad 200 FC 128 (acid form) in a 50:50 blend of diethylene glycol methyl ether and propylene glycol methyl ether solvent wherein the free acid content is 0.128 meq/g, 0.1 g of malonic acid solution (2.0 meq/ g of acid) in water, and 1 g of diethylene glycol methyl ether. After foaming ceases, the solution is applied to a stainless steel surface and cured at 150° C. for 30 minutes. The coated surface has a critical surface tension of wetting of 10 dynes/cm.

What is claimed is:

1. An adherent coating composition comprising a polymer containing a pendant benzyl portion linked through a benzyl ester linkage containing a hydrocarbon moiety containing at least two carbon atoms to a perfluorocarbon moiety having a perfluoroalkyl group, represented by the formula:

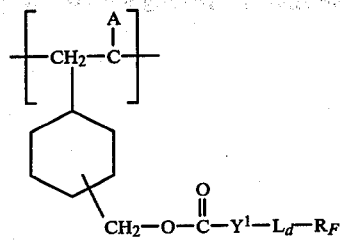

wherein A is hydrogen or methyl, $Y^1$ is a hydrocarbon moiety containing at least 2 carbon atoms, L is a noninterfering radical, d is 0 or 1, and $R_F$ is a saturated perfluoroaliphatic moiety, and wherein the coating exhibits a critical surface tension of wetting of less than about 15 dynes/cm.

2. An adherent coating composition of claim 1 represented by the formula

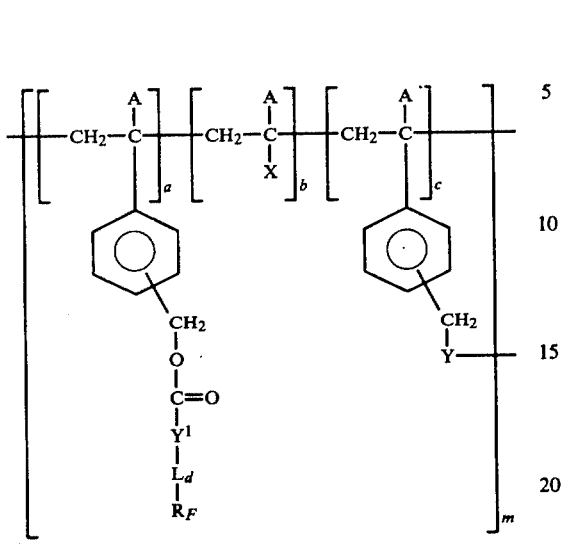

wherein $a+b+c=1$, a is greater than 0, b is from about 0 to about 0.9, c is from 0 to about 0.8, m is from about 100 to about 10,000, X is an essentially nonionic moiety and Y is the remaining portion of a polycarboxylic acid and is present in such a way that crosslinking is introduced to the polymer system.

3. An adherent coating composition of claim 2 wherein $b=0$ and $c=0$.

4. An adherent coating composition of claim 2 wherein $b=0$.

5. An adherent coating composition of claim 1 comprising a polymer having repeating units of the formula

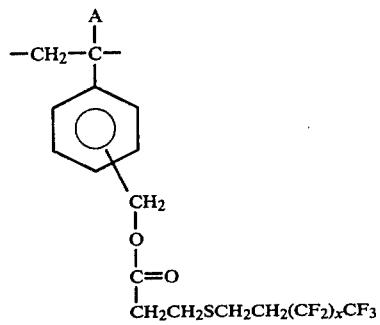

wherein A is hydrogen or methyl, and x is from about 3 to about 18.

6. A composition comprising a polyvinylbenzyl sulfonium containing polymer, a nucleophilic fluoroalkyl-containing carboxylic acid, and a suitable solvent, such that when cured, said composition yields an adherent coating composition of claim 1.

7. A composition comprising a polyvinylbenzyl sulfonium containing polymer, a nucleophilic fluoroalkyl-containing carboxylic acid, a polyfunctional carboxylic acid, and a suitable solvent, such that when cured, said composition yields an adherent coating composition of claim 2.

8. A composition of claim 6 wherein said suitable solvent is diethylene glycol methyl ether, or a mixture of diethylene glycol methyl ether and propylene glycol methyl ether.

9. A coated substrate wherein the coating for the substrate results from contacting the composition of claim 6 with said substrate and curing.

10. A coated substrate wherein the coating for the substrate results from contacting the composition of claim 1 with said substrate.

11. A process for reducing the amount of sticking of material on the internal surfaces of a molding apparatus which comprises applying a solution of the composition of claim 6 to said surfaces and curing such that the resulting adherent nonreactive coating has a critical surface tension of wetting less than about 15 dynes/cm.

12. A process for reducing the amount of sticking of material on the internal surfaces of a molding apparatus which comprises applying a solution of the composition of claim 7 to said surfaces and curing such that the resulting adherent nonreactive coating has a critical surface tension of wetting less than about 15 dynes/cm.

* * * * *